United States Patent
DiTullio et al.

(10) Patent No.: US 10,628,188 B2
(45) Date of Patent: Apr. 21, 2020

(54) DISABLING JUST-IN-TIME TRANSLATION FOR APPLICATION FUNCTIONS

(71) Applicant: Apptimize LLC, San Francisco, CA (US)

(72) Inventors: Jeff DiTullio, Menlo Park, CA (US); Michael Ryan Fenton, Thunder Bay (CA); James Brandon Koppel, Cambridge, MA (US); Timothy D. Lundeen, San Francisco, CA (US)

(73) Assignee: Apptimize LLC, San Francisco, CA (US)

( * ) Notice: Subject to any disclaimer, the term of this patent is extended or adjusted under 35 U.S.C. 154(b) by 0 days.

(21) Appl. No.: 16/112,329

(22) Filed: Aug. 24, 2018

(65) Prior Publication Data
US 2019/0065223 A1    Feb. 28, 2019

Related U.S. Application Data

(60) Provisional application No. 62/549,541, filed on Aug. 24, 2017.

(51) Int. Cl.
*G06F 9/44* (2018.01)
*G06F 9/455* (2018.01)

(52) U.S. Cl.
CPC .................. *G06F 9/4552* (2013.01)

(58) Field of Classification Search
None
See application file for complete search history.

(56) References Cited

U.S. PATENT DOCUMENTS

2016/0378446 A1* 12/2016 Ince .................. G06F 8/52
717/136

* cited by examiner

*Primary Examiner* — Qamrun Nahar
(74) *Attorney, Agent, or Firm* — Fenwick & West LLP

(57) ABSTRACT

Techniques to facilitate prevention of just-in-time (JIT) translations of application functions are disclosed herein. In at least one implementation, a JIT translation function of an operating system is modified in memory to redirect the JIT translation function to execute alternative code when the JIT translation function is called. When the JIT translation function is called for an application function, the alternative code is executed to determine whether the application function has been modified. When the alternative code determines that the application function has been modified, the JIT translation function is prevented from translating the application function into a native machine code version. When the alternative code determines that the application function has not been modified, the JIT translation function is allowed to translate the application function into the native machine code version.

20 Claims, 8 Drawing Sheets

DISABLING JUST-IN-TIME TRANSLATION FOR APPLICATION FUNCTIONS

RELATED APPLICATIONS

This application claims the benefit of, and priority to, U.S. Provisional Patent Application No. 62/549,541, entitled "DISABLING JUST-IN-TIME TRANSLATION FOR SPECIFIC FUNCTIONS" filed Aug. 24, 2017, which is hereby incorporated by reference in its entirety for all purposes.

TECHNICAL BACKGROUND

Modern computing systems such as smartphones, tablets, and other mobile devices enable users to install and run various applications. These mobile applications typically provide a wide range of functionality, such as streaming video, social networking, games, email, instant messaging, weather, navigation, or any other mobile application. An application may be referred to as "native" when the application program code has been developed for use on a particular platform or device.

In various runtime environments, it is possible to modify how a method, function, class, or other such software component maps to the actual code implementation of the component. Sometimes referred to as swizzling, such re-mapping technology allows code associated with one function to be replaced by code associated with another function. This may be useful in the context of making modifications to a user interface of an application, for example. Some implementations of re-mapping technology involve modifying the value of a pointer that points to a location in memory where a method is implemented in code. By changing the value of the pointer, the method can be made to point to other code such that, when the method is called, a different method is employed in its place. The target method that is called in place of the original method is sometimes referred to as a callback function. Such techniques may enable a software development kit (SDK) to make modifications to an application without altering the main program code of the application.

Certain runtime environments provide shared-object libraries containing native-code methods that may be used to perform various functions and features. In some instances, an SDK configured to make real-time modifications to an application might require access to the memory addresses of symbols in the shared-object library in order to modify or block certain native-code methods that would otherwise complicate or prevent the SDK from making these modifications. However, some operating systems could prevent an application from opening a shared-object library, thereby blocking the application from accessing the memory locations of the symbols in the library.

Version 7 of the Android® operating system added just-in-time (JIT) translation of Java™ bytecode into native machine processor code on a method-by-method basis. JIT translation is triggered when a Java method is called frequently, which causes the method to be queued and then translated into native machine code. Once translated, the Android Runtime (ART) switches to using the native machine processor code instead of the Java bytecode whenever that method is subsequently called, which provides an optimization over using the bytecode version of the function.

Overview

Provided herein are techniques to facilitate prevention of just-in-time (JIT) translations of application functions. In at least one implementation, a JIT translation function of an operating system is modified in memory to redirect the JIT translation function to execute alternative code when the JIT translation function is called. When the JIT translation function is called for an application function, the alternative code is executed to determine whether the application function has been modified. When the alternative code determines that the application function has been modified, the JIT translation function is prevented from translating the application function into a native machine code version. When the alternative code determines that the application function has not been modified, the JIT translation function is allowed to translate the application function into the native machine code version.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

DETAILED DESCRIPTION

Figure 1:
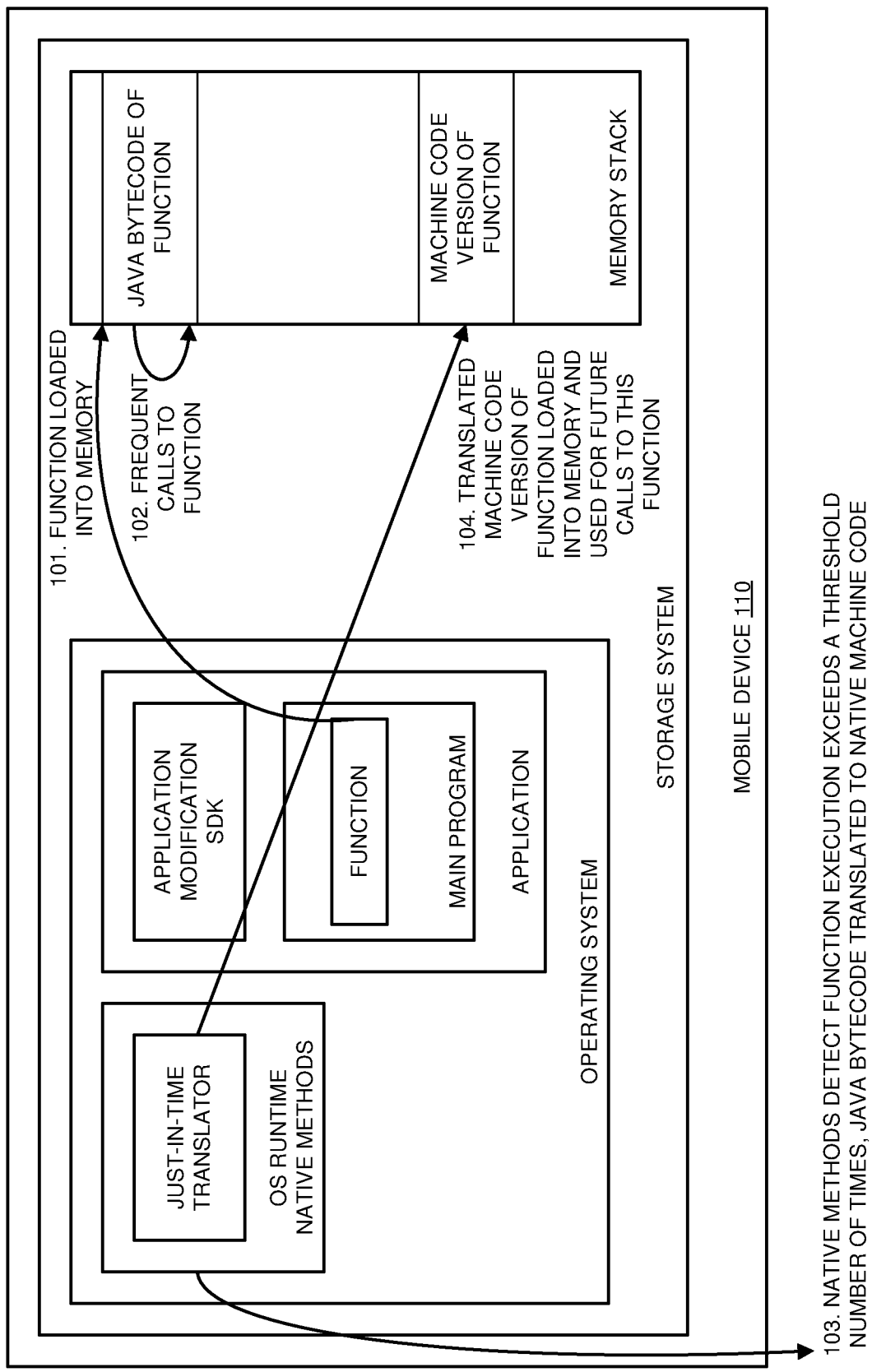
FIG. 1 is a block diagram that illustrates a process flow of a problem statement.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Mobile application designers often desire to make changes and updates to visual elements and other aspects of the user interface of an application. Ordinarily, such changes would require the application developers to edit program code to implement the new application design requirements. However, a framework can be installed into a mobile application which can receive and interpret changes to visual properties of display elements, providing a quick and easy way for designers to edit the user interface of a mobile application without having to write any programming code.

Such changes and new features can then be tested on subsets of the user base using various techniques such as A/B testing, staged rollouts, and feature toggling. In order to achieve some of this functionality, the framework may need to intercept, or swizzle, various functions of the application. For example, the framework may utilize a software development kit (SDK) that employs swizzling techniques to intercept calls to certain functions and run different code instead of or in addition to the hooked function. In the Android® Runtime (ART) environment, applications are commonly written in Java® and compiled to bytecode for the Java virtual machine. Thus, when the SDK employs swizzling on a function of an application designed to run on the ART environment, the Java bytecode of that function is manipulated to implement the swizzling. However, version 7 of the Android operating system added just-in-time (JIT) translation of Java bytecode to native machine processor code on a method-by-method basis. JIT translation is triggered when a Java bytecode method is called frequently during runtime, which causes the method to be queued and then translated into native machine code. Once translated, the ART switches to using the native machine processor code instead of the Java bytecode for any future calls to that method. Unfortunately, although the JIT translation to native machine code provides an optimization over using the Java bytecode, if the bytecode version of a function was swizzled, it will no longer operate as intended once the bytecode is translated into native code. As a result, the JIT machinery cannot be allowed to translate swizzled functions, or to use previously-translated native machine code for that function. The following disclosure provides various techniques for disabling just-in-time translations for specific functions on which swizzling has been employed, while still allowing JIT to perform its optimizations and translate other functions that have not been manipulated.

Systems, methods, and software are disclosed herein that enhance application development and software design-for-test (DFT) technology utilizing an application development and optimization platform to facilitate disabling just-in-time translations of specific functions. Among other benefits, the techniques described herein provide an application developer the ability to block the just-in-time translation of a function from a bytecode implementation into native machine code that would otherwise complicate or prevent the developer from making modifications to a mobile application.

Figure 2:
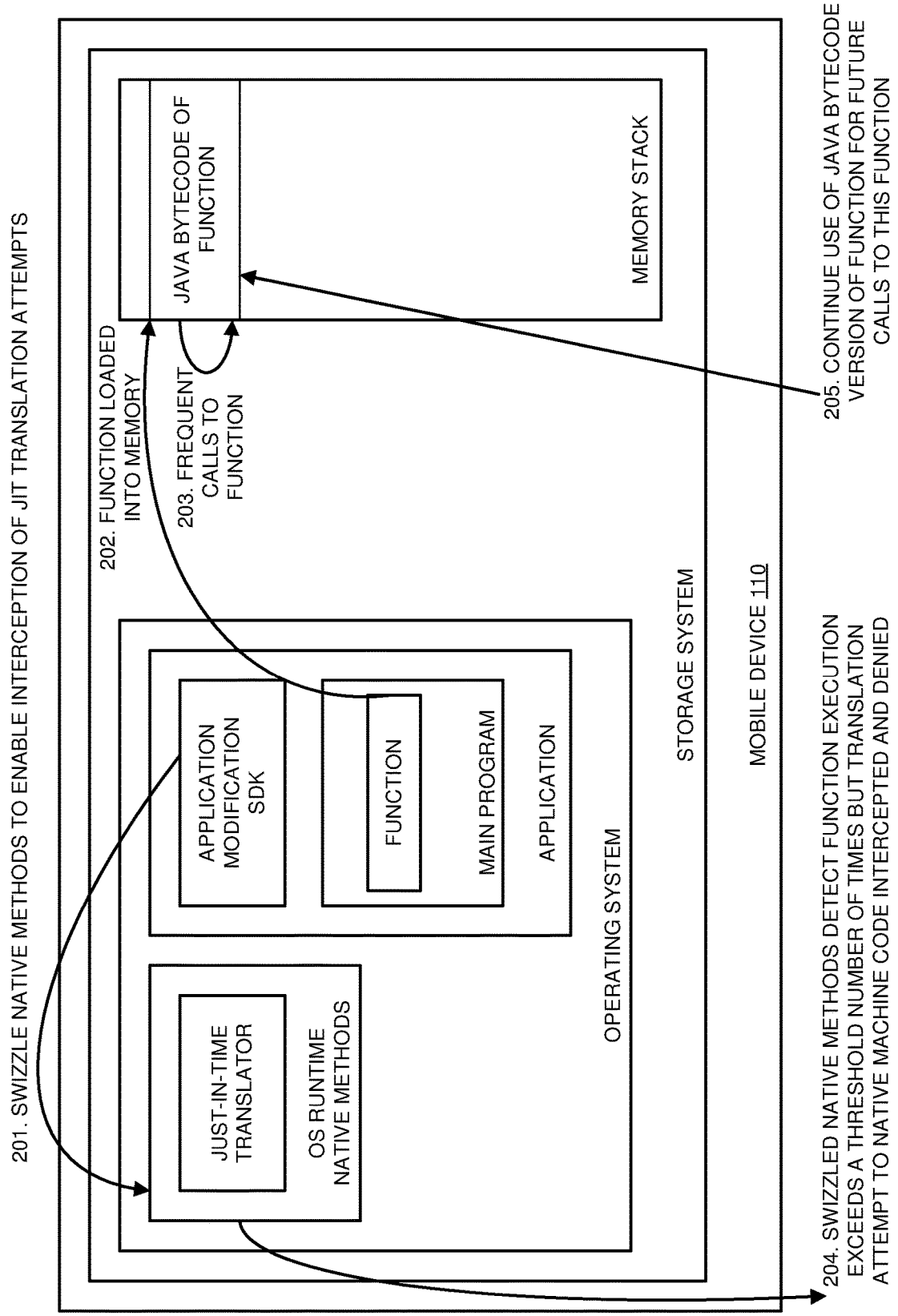
FIG. 2 is a block diagram that illustrates a process flow in an exemplary embodiment.
Figure 3:
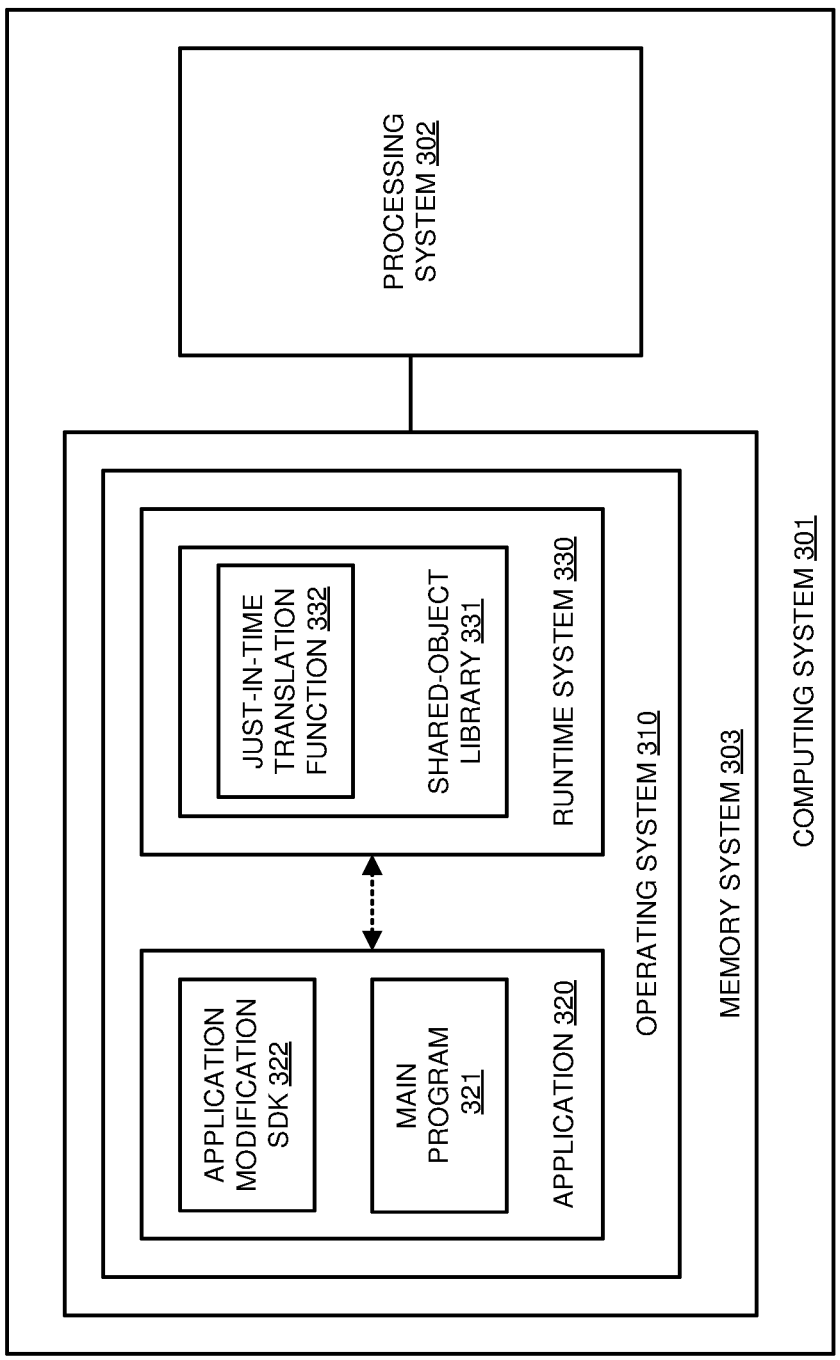
FIG. 3 is a block diagram that illustrates a computing system.
Figure 4:
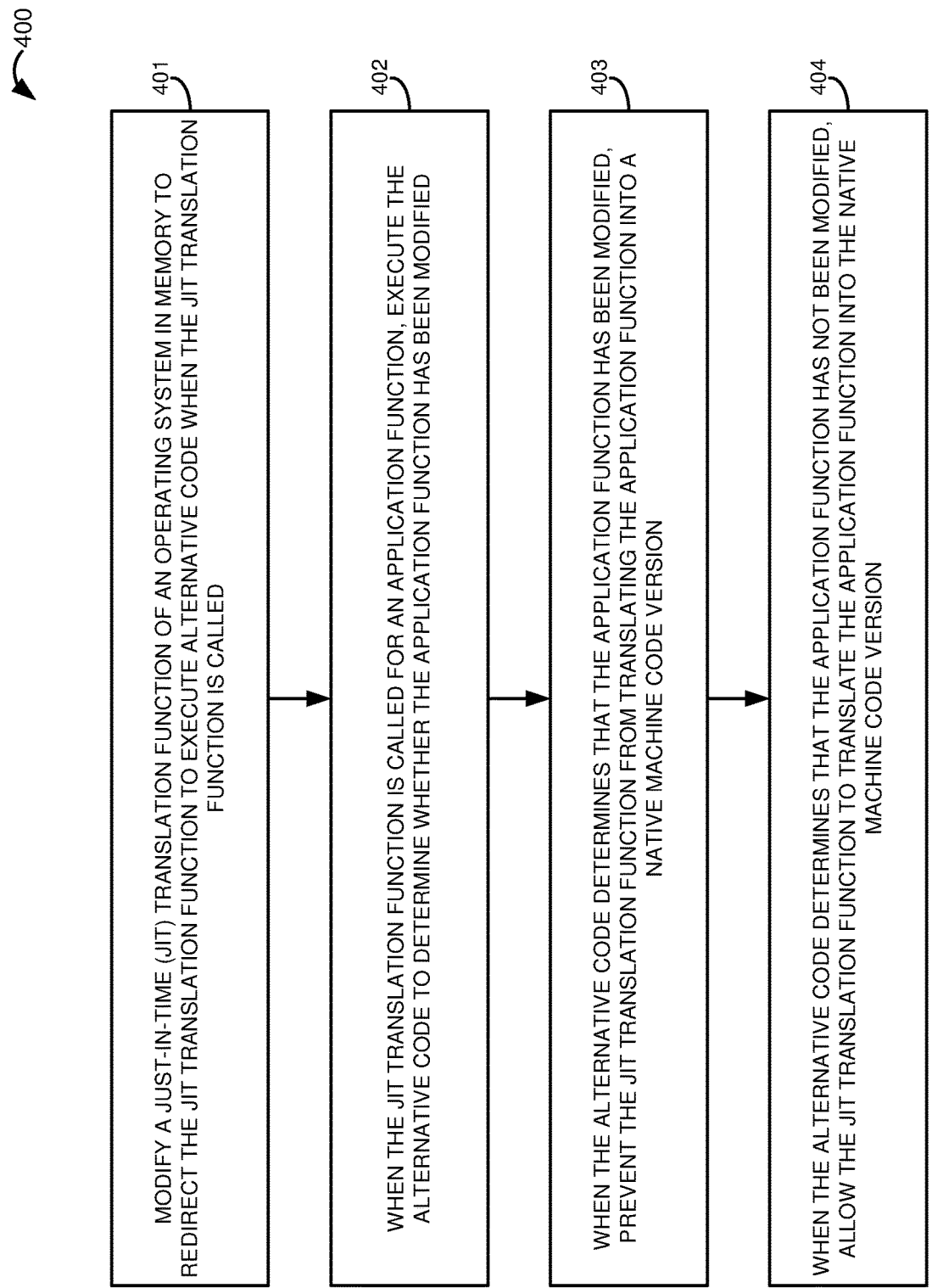
FIG. 4 is a flow diagram that illustrates an operation of a computing system in an exemplary embodiment.
Figure 5A:
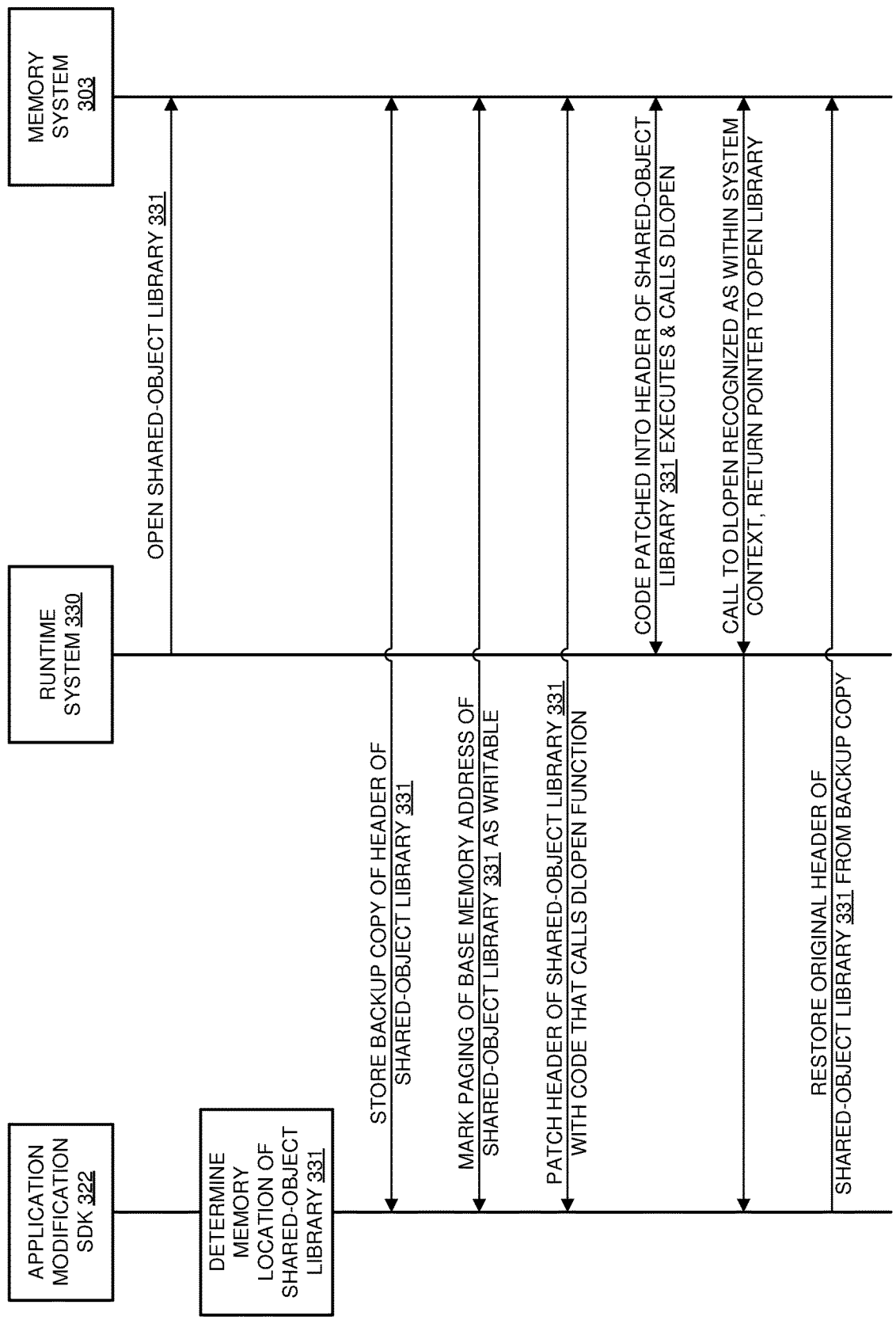
FIG. 5A is a sequence diagram that illustrates an operation of a computing system in an exemplary embodiment.
Figure 5B:
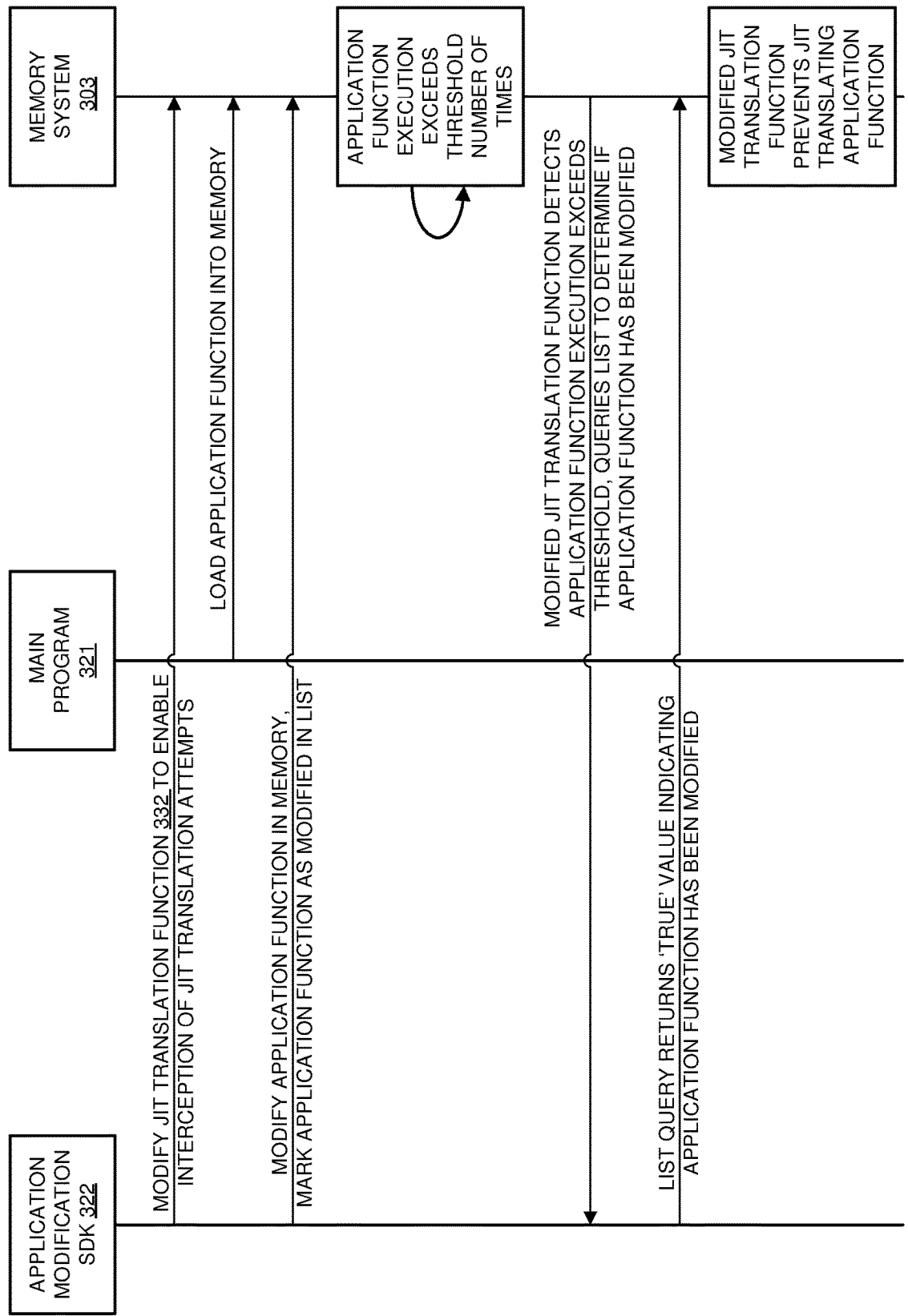
FIG. 5B is a sequence diagram that illustrates an operation of a computing system in an exemplary embodiment.
Figure 6:
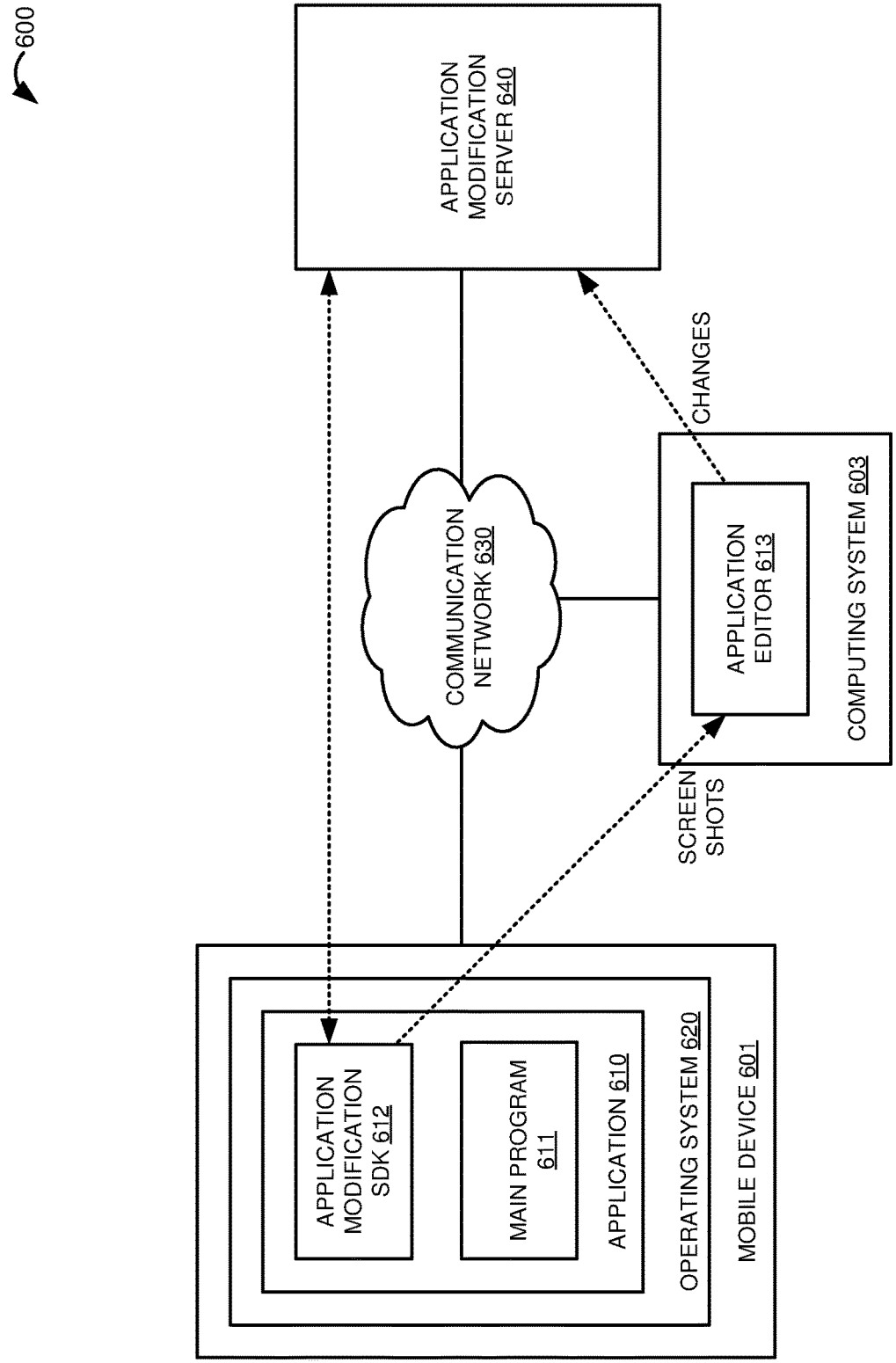
FIG. 6 is a block diagram that illustrates a communication system.
Figure 7:
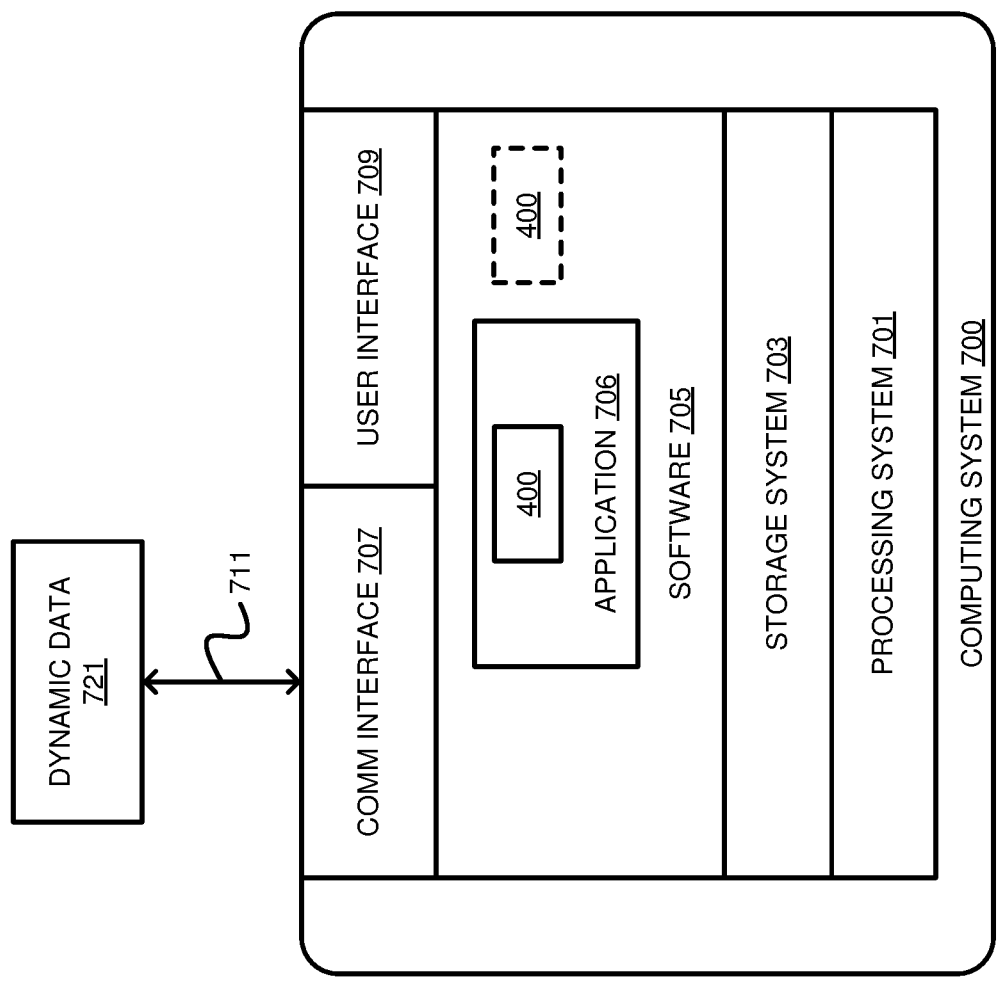
FIG. 7 is a block diagram that illustrates a computing system.

Referring now to the drawings, FIG. 1 illustrates an exemplary process flow of a problem statement related to a just-in-time translation of a bytecode function to native machine code, while FIG. 2 illustrates a process flow of a technique to prevent this just-in-time translation in an exemplary embodiment. FIG. 3 illustrates an exemplary computing system, while FIGS. 4, 5A, and 5B illustrate operations of the computing system in exemplary embodiments. FIG. 6 illustrates a communication system that may be utilized to implement customizations of visual elements and other features of an application in an exemplary embodiment, while FIG. 7 illustrates an exemplary computing system that may be used to perform any of the techniques, processes, and operational scenarios described herein.

Turning now to FIG. 1, an exemplary process flow of a problem statement related to a just-in-time translation of a Java bytecode function to native machine code is illustrated. The steps of the process flow are labeled 101 through 104. In this example, the process flow describes the execution of program code on mobile device 110. Mobile device 110 comprises a storage system on which an operating system (OS) is installed. The operating system includes OS runtime native methods which include a just-in-time translator in this example. A mobile application is installed on the operating system that includes main program code having several different functions, although only one function of the application is shown in FIG. 1 for clarity. In this example, the function is initially provided from the application in Java bytecode, and has been swizzled by modifying the function to point to and run customized code stored in a different memory location than the actual function.

Referring now to the process flow of FIG. 1, initially the Java bytecode of the function is loaded into memory, as shown in step 101. Note that the entire application is typically loaded into memory when it runs, but only the function at issue here is shown in the memory stack of FIG. 1 for clarity. The function of the application is then repeatedly called on a frequent basis, as shown in step 102. In this example, the OS runtime native methods are configured to grab the Java bytecode of functions that are frequently executing and utilize the just-in-time translator to convert the bytecode into native machine code for optimizing subsequent execution iterations of those functions. Thus, as shown in step 103, the OS native methods detect that the function execution has exceeded a threshold number of times, and the Java bytecode of the function is translated to native machine code. When this happens, the translated machine code version of the function is loaded into memory and used for future calls to this function, as shown in step 104. However, since the native code version of the function is stored at a different memory location than the bytecode implementation, the modifications to the bytecode version of the function that enabled the swizzling functionality will no longer operate as intended. Consequently, it is desirable to prevent the just-in-time translation of this function in order to preserve and continue to run the bytecode format of the function and maintain the swizzling modifications. One technique of bypassing the just-in-time translation of bytecode to native code for specific functions that have been modified to support swizzling will now be described with respect to FIG. 2.

FIG. 2 illustrates an exemplary process flow that prevents the just-in-time (JIT) translation of specific functions of an application. The steps of the process flow are labeled 201 through 205 in this example. Initially, as described in step 201, certain OS native code methods are redirected, or swizzled, in memory to enable interception of just-in-time translation attempts on particular application functions. To achieve this, the OS native methods that are triggered to run the JIT translation on frequently-called bytecode functions may be modified to intercept the call for JIT translation and instead run customized code. The customized code would check to see if the target of the JIT translation is an application function that has been modified, or swizzled, in order to intercept the operation of that function and instead run alternative application code. If the target of the JIT translation is a swizzled application function, the swizzled OS native code method denies running the JIT translation on this application function, thereby preserving the Java bytecode version of that application function so that the bytecode continues to execute when the function is called in the future.

After the OS native methods have been swizzled and redirected to point to customized code in memory that operates to intercept JIT translation attempts on certain modified application functions as described above, the runtime system loads a function of the application into memory, as shown in step 202. Note that the entire application is typically loaded into memory when it runs, but only the application function at issue here is shown in the memory stack of FIG. 2 for clarity. In this example, the function is initially provided from the application in Java bytecode, and has been swizzled by modifying the description block of the function to point to and run customized application code stored in a different memory location than the actual application function. The function of the application is then repeatedly called on a frequent basis, as shown in step 203. In this example, the OS runtime native methods are configured to capture the Java bytecode of functions that are frequently executing and utilize the just-in-time translator to convert the bytecode into native machine code for optimizing subsequent execution iterations of the function. Thus, as shown in step 204, the OS native methods detect that the function execution has exceeded a threshold number of times, which would ordinarily trigger JIT translation of the Java bytecode of the function into native machine code. However, in this case the OS native methods that trigger the JIT translation are swizzled and redirected by a pointer to a memory location containing custom code designed to detect and deny JIT translation attempts on swizzled application functions, as discussed above with respect to step 201 of FIG. 2. When the custom code runs, a determination is made as to whether or not the application function targeted for JIT translation has been modified, or swizzled, to redirect the function call to another location in memory where customized code can run for that application function. For example, the SDK installed on the mobile application could keep track of which Java bytecode functions of the application have been modified, or swizzled, in a map or list of swizzled functions, which can return a Boolean value indicating whether or not a particular function is included in the list. Accordingly, when the swizzled OS native methods that trigger the JIT translation are redirected to the custom code designed to detect and deny JIT translation attempts on swizzled application functions, the custom code could query the list of swizzled application functions with the particular application function target of the JIT translation attempt, and deny the JIT translation if the function appears in the list. Of course, if the target application function does not appear in the list of previously-swizzled functions, then a copy of the original OS runtime native method could be run to trigger the JIT translation on this unmodified function in order to translate the Java bytecode into native machine code for increased optimization. However, in this case, the target method would appear in the list of swizzled functions, so the custom code returns with a denial of the JIT translation attempt on this previously-swizzled application function. Accordingly, the runtime system will continue to use the Java bytecode version of the function for future calls to this function, as shown in step 205, thereby preserving the swizzling applied to this application function.

In at least one implementation, the OS native code methods that are modified to prevent the JIT translation from occurring on certain application functions as described above could be part of protected OS code, such as part of a shared-object library or some other functionality controlled by the runtime system. In such cases, the OS could include protections that attempt to prevent modifying, or swizzling, the OS native code methods that require interception in order to deny JIT translation attempts on particular application functions. For example, the OS native code methods could be included in a shared-object library that need to be opened, which could be achieved by calling the dlopen function on the library in some examples. However, when an application calls a function to open a shared-object library, such as the dlopen function, the runtime system may be configured to check the caller's context, and only allow for opening libraries that are part of the caller's context. Libraries that were previously loaded outside of the caller's context, such as those loaded by the runtime system, would not be accessible from the caller's context and thus would be prevented from opening in response to the application's call to open the library. To bypass this context check protection, when the runtime systems loads a shared-object library into memory, the application could patch the header of the shared-object library with code that calls dlopen. In at least one implementation, in order to determine where in memory the shared-object library is loaded so that the header may be patched, the application could determine the base address of the shared-object library based on its call address. The call address is the location in memory where a block of code is called, and the base address of that code can be determined by looking at what memory address is referenced by the call address. In other words, the application could step backwards from the call address to determine the base address of the shared-object library, which identifies where the library is loaded into memory, and this base address location will persist during runtime. The base memory address of the shared-object library is then recorded and the paging for this address can be marked as writable. The data bytes stored at that memory address may then be copied to another location in memory to store a backup copy of the original header data prior to patching the header. The header is then patched with code that calls the dlopen function. When the code that was patched into the header of the shared-object library executes, the code calls dlopen from the system's copy of the shared-object library. In this manner, the call to dlopen is received from the shared-object library loaded by the runtime system, and is therefore recognized as part of the system's context. Accordingly, dlopen allows the shared-object library to be opened since the return address of the call is within the system's context, and returns a pointer to the opened library. After successfully opening the shared-object library, the original header of the shared-object library can be restored from the backup copy to allow normal program operation. The now-opened shared-object library allows access to the memory addresses of symbols, functions, variables, and other components of the library, as described in step six. With knowledge of these memory addresses, the once read-only member functions and symbols of the shared-object library may now be manipulated in memory to disable or alter various features and functionality provided by the library, such as the JIT translation of the runtime system as described herein, that would otherwise complicate or prevent the SDK and/or application from swizzling portions of the application code or executing those swizzled application functions.

Turning now to FIG. 3, a block diagram of computing system 301 is illustrated. Computing system 301 comprises processing system 302 and memory system 303. Processing system 302 is operatively coupled with memory system 303. Memory system 303 stores operating system 310, application 320, runtime system 330, and shared-object library 331. Application 320 includes main program code 321 and application modification software development kit (SDK) 322. Shared-object library 331 is loaded by runtime system 330 and includes just-in-time (JIT) translation function 332. In at least one implementation, runtime system 330 could comprise an Android® Runtime (ART) environment. Further, in some implementations, JIT translation function 332 could comprise ART native methods configured to detect when application functions compiled in Java bytecode are called a threshold number of times, and to employ JIT translator machinery to translate the Java bytecode into native machine code for use in subsequent calls to those functions.

In operation, processing system 302 retrieves program code for operating system 310, application 320, and runtime system 330 from memory system 303, and upon retrieval, processing system 302 loads and executes operating system 310, application 320, and runtime system 330 using available memory space of memory system 303. Upon execution, runtime system 330 loads shared-object library 331. Exemplary operations of computing system 301 to facilitate prevention of just-in-time translations of application functions will now be discussed with respect to FIGS. 4, 5A, and 5B.

FIG. 4 is a flow diagram that illustrates an operation of computing system 301 in an exemplary implementation. The operation 400 shown in FIG. 4 may also be referred to as JIT translation prevention process 400 herein. The steps of the operation are indicated below parenthetically. The following discussion of operation 400 will proceed with reference to elements of computing system 301 of FIG. 3 in order to illustrate its operations, but note that the details provided in FIG. 3 are merely exemplary and not intended to limit the scope of process 400 to the specific implementation of FIG. 3.

Operation 400 may be employed by computing system 301 to facilitate prevention of just-in-time translations of application functions. As shown in the operational flow of FIG. 4, application 320 directs computing system 301 to modify a just-in-time (JIT) translation function 332 of operating system 310 in memory to redirect the JIT translation function 332 to execute alternative code when the JIT translation function 332 is called (401). In at least one implementation, a control module embedded into application 320, such as application modification SDK 322, may be configured to modify the JIT translation function 332 in memory. In some examples, the modification to JIT translation function 332 could comprise modifying the value of a pointer that points to the location in memory where JIT translation function 332 is loaded to instead point to the alternative code such that, when JIT translation function 332 is called, the alternative code is executed instead.

In order to modify JIT translation function 332 of operating system 310 in memory, computing system 301 may first determine the memory address where JIT translation function 332 and/or shared-object library 331 are loaded into memory. In some implementations, application 320 and/or SDK 322 could determine where in memory shared-object library 331 and/or JIT translation function 332 are located by checking a process identification map, such as the proc/id/ map in Linux® operating systems. In some examples, shared-object library 331 may then be opened in order to access the memory locations of its various symbols and functions, including JIT translation function 332, by calling a function that returns a pointer to the opened library, such as the dlopen function in Linux® operating systems. However, certain operating systems may prevent an application from opening a library such as shared-object library 331 that was opened by runtime system 330. For example, version 7 of the Android® operating system added context checking for dlopen calls, and no longer allows an application to call dlopen on libart.so or other shared-object libraries that were already loaded by the runtime system. Specifically, the check added to dlopen in Android® 7 looks at the caller's return address, and allows libraries to be opened if they are part of the caller's context, or if they are a new, previously unloaded library. For libraries that have already been loaded by another context, such as runtime system 330, a new copy of the library is loaded in the caller's namespace, so there is no access by the caller to the memory addresses of symbols in any library that was previously loaded in another context.

In order to work around this context checking and determine where shared-object library 331 and/or JIT translation function 332 are located in memory, in at least one implementation application 320 may direct computing system 301 to determine a base memory address of shared-object library 331 based on a call address of shared-object library 331. The call address is the location in memory where a block of code is called, and the base address of that code can be determined by looking at what memory address is referenced by the call address. For example, application 320 and/or SDK 322 may receive information from the statements chain of operating system 310 that indicates where the call address of shared-object library 331 is located in the call stack. The base address of shared-object library 331 could then be determined by stepping backwards from the call address. The base address of shared-object library 331 identifies where library 331 is loaded into memory, which will persist during runtime. The base memory address of shared-object library 331 may then be recorded, and the paging of the base memory address of shared-object library 331 can be marked as writable. The data bytes stored at the base memory address of shared-object library 331 can be copied to another location in memory system 303 to store a backup copy of the original header data.

Once the memory address of shared-object library 331 is known, application 320 may direct computing system 301 to patch the header of shared-object library 331 loaded by runtime system 330 with code configured to call an open function, such as dlopen. Upon execution, the code patched into the header of shared-object library 331 calls the open function from shared-object library 331 loaded by runtime system 330, the call to the open function is recognized as within a context of runtime system 330, and shared-object library 331 is allowed to be opened. The open function may then return a pointer to the opened library. After successfully opening shared-object library 331, the original header of shared-object library 331 can be restored from the backup copy to allow normal program operation. The now-opened shared-object library 331 allows access to the memory addresses of symbols, functions, variables, and other components of the library, such as JIT translation function 332. With knowledge of these memory addresses, the once inaccessible member functions and symbols of shared-object library 331 may now be manipulated in memory with the alternative code in order to disable or alter various features and functionality provided by the library, such as the just-in-time translation functionality of JIT translation function 332.

Once JIT translation function 332 is modified in memory to redirect JIT translation function 332 to execute the alternative code, when JIT translation function 332 is called for an application function, the alternative code is executed to determine whether the application function has been modified (402). In some examples, the application function may be a function of main program 321. The application function may initially comprise a bytecode version of the application function in some implementations. In at least one implementation, the application function may be modified in memory to intercept an execution of the application function and instead run customized program code, and the application function may then be included in a list of modified application functions upon modifying the application function in memory. For example, application 320 and/or SDK 322 may be configured to modify the application function in memory to intercept the execution of the application function and instead run customized program code, and could then include the application function in the list of modified application functions. In some examples, the customized program code may be configured to modify visual elements of application 320 in real-time, among other functionality. In some examples, JIT translation function 332 may be called for the application function after a threshold number of calls to the application function are exceeded. However, due to the redirection modification in memory, when JIT translation function 332 is called for the application function, the alternative code is executed to determine whether the application function has been modified. In at least one implementation, executing the alternative code to determine whether the application function has been modified may comprise determining whether the application function has been modified in memory to intercept an execution of the application function and instead run customized program code. For example, in some implementations, the alternative code could be executed to determine whether the application function has been modified by checking whether the application function is included in a list of modified application functions. In at least one implementation, checking whether the application function is included in the list of modified application functions could comprises querying the list of modified application functions with the application function and receiving a Boolean value returned from the querying that indicates whether the application function is included in the list of modified application functions. Other techniques of executing the alternative code to determine whether the application function has been modified are possible and are within the scope of this disclosure.

When the alternative code determines that the application function has been modified, JIT translation function 332 is prevented from translating the application function into a native machine code version (403). For example, upon determining that the application function has been modified, the alternative code may direct computing system 301 to prevent JIT translation function 332 from translating the application function into a native machine code version. In some implementations, the prevention of JIT translation function 332 from translating the application function may be achieved by returning program execution to a point in memory after a call to the JIT translator functionality would otherwise be made by JIT translation function 332, so that the JIT translation of the application function into native machine code never occurs. Accordingly, the application function will remain in its original format, such as a bytecode implementation, and will remain at its original location in memory, which ensures that the modifications made to the application function will be preserved and any customized program code for the application function will continue to execute as intended.

However, when the alternative code determines that the application function has not been modified, JIT translation function 332 is allowed to translate the application function into the native machine code version (404). In this case, since the application function was never modified to execute customized program code, there is no harm in allowing the JIT translation function 332 from translating the application function into the native machine code version. Accordingly, the JIT translation function 332 may be allowed to run and translate the application function into a native machine code version, thereby allowing for a more optimized execution of the application function upon subsequent calls to the function in the future.

Advantageously, by modifying JIT translation function 332 in memory to redirect JIT translation function 332 to execute alternative code when the JIT translation function 332 is called for an application function, the JIT translation of the application function may be prevented when the alternative code determines that the application function has been modified. In this manner, the application function will remain in its original code format at its original memory location, which ensures that the modification made to the application function will be preserved and any customized program code for the application function will continue to execute as intended. Alternatively, if the JIT translation function 332 were allowed to translate the application function into a native machine code version, the memory location of the application function would change to point to the location of the native machine code, which would complicate or prevent application 320 and/or SDK 322 from manipulating the behavior of the program code of the application function through swizzling or other techniques. Another exemplary operation of computing system 301 to facilitate prevention of just-in-time translations of application functions will now be discussed with respect to FIGS. 5A and 5B.

FIG. 5A is a sequence diagram that illustrates an operation of computing system 301 in an exemplary implementation. In this example, JIT translation function 332 and other native methods of the runtime system 330 work to complicate or prevent SDK 322 and/or application 320 from swizzling portions of the application code or executing those swizzled methods. In particular, after a requisite number of calls to a particular application function, JIT translation function 322 is configured to grab the target application function and translate the bytecode of the function into native machine code. Once translated, the native machine code will be used instead of the original bytecode for any future calls to the target application function. Unfortunately, when the bytecode version of the target application function was swizzled to modify its operation, it will no longer operate as intended once the bytecode is translated into native code. As a result, the JIT translation machinery cannot be allowed to translate swizzled functions, or to use previously-translated native machine code for that function.

The Android® 7 operating system added context checking for dlopen calls, and no longer allows an application to call dlopen on libart.so or other shared-object libraries that were already loaded by the runtime system. Specifically, the check added to dlopen in Android® 7 looks at the caller's return address, and allows libraries to be opened if they are part of the caller's context, or if they are a new, previously unloaded library. For libraries that have already been loaded by another context, such as the runtime system 330, a new copy of the library is loaded in the caller's namespace, so there is no access by the caller to the memory addresses of symbols in any library that was previously loaded in another context. The operation of FIG. 5A describes one technique of bypassing a context check for dlopen calls to enable an application 320 to open shared-object library 331 that was previously loaded by runtime system 330. Once the context check is bypassed and shared-object library 331 is allowed to be opened, the application 320 has access the memory addresses of symbols, functions, and variables of shared-object library 331, including JIT translation function 332. The operation of the JIT translation machinery can then be modified by swizzling JIT translation function 332 and redirecting it in memory to instead run alternative program code that may block the JIT translation from occurring for a target application function, as discussed in FIG. 5B.

Now referring to the sequence diagram of FIG. 5A, runtime system 330 initially opens shared-object library 331 in the memory space of memory system 303. Subsequently, application modification SDK 322 determines the memory location of shared-object library 331. In some examples, SDK 322 may determine where shared-object library 331 is located in memory by checking a process identification map, such as the proc/id/map in Linux® operating systems, or by looking at what memory address is referenced by the call address of shared-object library 331 to determine its base address. Once the base address of shared-object library 331 is determined, SDK 322 may then record base address of shared-object library 331, and the data bytes stored at the base memory address of shared-object library 331 can be copied to another location in memory system 303 to store a backup copy of the original header data of shared-object library 331.

In order to enable patching of the header information, application modification SDK 322 marks the paging of the base address of shared-object library 331 as writable. SDK 322 then patches the header of shared-object library 331 with code that calls the dlopen function. Subsequently, the code patched into the header of shared-object library 331 executes and calls the dlopen function from within the context of shared-object library 331 loaded by runtime system 330. Accordingly, since the call to the dlopen function is received from shared-object library 331 loaded by runtime system 330 and thus is recognized as within the context of runtime system 330, the shared-object library 331 is allowed to be opened. Upon opening the shared-object library 331, the dlopen function returns a pointer to the opened library.

SDK 322 receives the pointer to shared-object library 331 returned by the dlopen function that was called by way of the patched header of shared-object library 331. Accordingly, SDK 322 is informed of the memory location of the opened shared-object library 331 as indicated in the pointer. Application modification SDK 322 then restores the header of shared-object library 331 to the original version using the backup copy of the header of shared-object library 331 to allow for normal program operation.

With knowledge of the memory address of shared-object library 331 as returned in the pointer by the dlopen function, SDK 322 may now beneficially access the memory addresses of symbols, functions, variables, and other components of shared-object library 331. Accordingly, the JIT translation function 332 of shared-object library 331 may then be manipulated in memory by SDK 322 in order to disable the JIT machinery from executing on swizzled methods of application 320, thereby enabling SDK 322 to modify visual elements of application 320 in real-time using swizzled methods. One technique to modify JIT translation function 332 to facilitate prevention of just-in-time translations of application functions will now be discussed with respect to FIG. 5B.

FIG. 5B is a sequence diagram that illustrates an operation of computing system 301 in an exemplary implementation. In this example, JIT translation function 332 and other native methods of the runtime system 330 work to complicate or prevent SDK 322 and/or application 320 from swizzling portions of the application code or executing those swizzled methods. In order to prevent the JIT translation machinery from translating swizzled application functions, or using previously-translated native machine code for those functions, the JIT translation function 332 is modified to enable interception of JIT translation attempts on target application functions. For example, JIT translation function 332 and other OS native code methods are redirected, or swizzled, in memory to enable interception of just-in-time translation attempts on targeted application functions. To achieve this, JIT translation function 332 and/or the other OS native methods that are triggered to run the JIT translation on frequently-called bytecode functions of application 320 may be modified to intercept the call for JIT translation and instead run alternative code. The alternative code would check to see if the target of the JIT translation is an application function that has been modified, or swizzled, in order to intercept the operation of that function and instead run alternative application code. If the target of the JIT translation is a swizzled application function, the modified JIT translation function 332 denies running the JIT translation on the target application function, thereby preserving the Java bytecode version of the target function so that the bytecode continues to execute when the function is called in the future.

Referring to the sequence diagram of FIG. 5B, after JIT translation function 332 has been modified and redirected to point to alterative code in memory that operates to intercept JIT translation attempts on swizzled application functions as described above, main program 321 loads an application function of application 320 into memory. In this example, the function is initially provided from the application in Java bytecode, and has been swizzled by modifying the description block of the function to point to and run customized application code stored in a different memory location than the actual application function. After modifying the application function, application modification SDK 322 keeps track of which Java bytecode functions of application 320 have been modified, or swizzled, by marking the target application function as modified in a list of swizzled functions. When queried, the list can then return a Boolean value indicating whether or not a particular application function is identified in the list as being modified.

Still referring to FIG. 5B, the application function is then repeatedly called on a frequent basis so that execution of the function exceeds a threshold number of times. As discussed above, in this example JIT translation function 332 is modified and redirected by a pointer to a memory location containing alternative code designed to detect and deny JIT translation attempts on swizzled application functions. Accordingly, when the alternative code runs, JIT translation function 332 detects that the execution of the application function has exceeded a threshold, and queries the list of modified application functions to determine if the application function has been modified. When queried, the list returns a Boolean value indicating that the application function is included in the list as being modified, or swizzled, in order to redirect the function call to another location in memory where customized code can run for that application function. In this case, since the target method appears in the list of swizzled functions, the alternative code of the modified JIT translation function 332 prevents the JIT translation attempt on this swizzled application function. Accordingly, runtime system 330 will continue to use the Java bytecode version of this function for future calls to the function, thereby preserving the swizzling applied to the application function. In this manner, the application function will remain in its original code format at its original memory location, which ensures that the modifications made to the application function to achieve the swizzling will persist, and any customized program code for the application function will continue to execute as intended.

Turning now to FIG. 6, a block diagram of communication system 600 is illustrated. Communication system 600 includes mobile device 601, computing system 603, communication network 630, and application modification server 640. Mobile device 601 includes operating system 620 and application 610. Application 610 runs on operating system 620. Mobile device 601 may also include a user interface that communicates with operating system 620 over a bus communication device. Application 610 comprises main program 611 and application modification software development kit (SDK) 612, which may be implemented as different software modules of application 610. Main program 611 comprises the primary program instructions for the functionality of the application, such as streaming video, social networking, email, instant messaging, weather, navigation, or any other mobile application. Application modification SDK 612 may be installed into application 610 to facilitate changes and updates to a user interface and other visual elements of the application 610, perform A/B testing of different application design variants, and other functionality. In some examples, application modification SDK 612 could comprise an embedded control module of application 610. Computing system 603 includes application editor 613. Computing system 603 may also include an operating system and user interface, although these components are not shown for clarity. Application modification server 640 comprises a computing system that provides an application development and optimization platform. In some examples, application editor 613 may comprise a web browser application that loads the application development and optimization platform provided by application modification server 640.

In operation, a developer of application 610 may execute application editor 613 on computing system 603 to operate an application management dashboard to apply real-time changes and updates to a user interface and other visual elements of the application 610, activate or deactivate features, perform A/B testing of different application design variants to determine how changes to application 610 affect user behavior, customize the application 610, modify web content displayed within a webview, and other functionality. The developer may execute application 610 on mobile device 601 for use as a test device, and the execution of application 610 would then be mirrored in the visual editor 613 executing on computing system 603. The mirrored execution of application 610 within application editor 613 is achieved by application modification SDK 612 transferring screenshots of the application 610 to computing system 603 for display within the editor 613, which may communicate over web sockets. SDK 612 sends information about the user interface of application 610 to computing system 603 for display within application editor 613, including the entire view hierarchy of application 610, which comprises descriptions or labels of all views that exist in the current interface and screenshots of the views. In this manner, the screenshots of the views can be displayed as images on the screen within the visual application editor 613, and the view descriptions, labels, and any other information may be displayed in a tree structure or tree diagram that represents the view hierarchy structure in a graphical form.

Once the visual application editor 613 receives and displays the view hierarchy of application 610, the developer can then click through the various views within the view hierarchy and make changes to different visual elements of the user interface. These changes are then sent to the application modification server 640 which can instantly update the display of application 610 with the changes in real-time on mobile device 601 via communication with application modification SDK 612. Similarly, other application management functionality of the visual application editor 613 may be created and communicated to application modification server 640 and subsequently deployed to application 610 on mobile device 601 by communicating with SDK 612. Of course, any of the functionality described herein could be applied to numerous instances of application 610 installed on multitudes of user mobile devices which may affect some or all of the entire user base, but only one mobile device 601 is shown in FIG. 6 for clarity. In some operating environments, the techniques described herein related to disabling just-in-time translations for specific functions of application 610 may be necessary in order for SDK 612 to perform some or all of the functionality described above, including the ability to update the display of application 610 with the changes in real-time on mobile device 601 using swizzled methods. For example, without employing the JIT translation bypass techniques disclosed herein, the bytecode version of a swizzled application function would be translated into native machine code, which would effectively break the swizzling applied to the bytecode version of that function since the memory locations for the native machine code will be different from the bytecode version. Thus, the swizzled application function will no longer operate as intended if the bytecode is translated into native code through a JIT translation, so the disclosed techniques may be used advantageously to prevent this from happening.

Still referring to FIG. 6, mobile device 601 comprises a processing system and communication transceiver. Mobile device 601 may also include other components such as a user interface, data storage system, and power supply. Mobile device 601 may reside in a single device or may be distributed across multiple devices. Examples of mobile device 601 include mobile computing devices, such as cell phones, tablet computers, laptop computers, notebook computers, and gaming devices, as well as any other type of mobile computing devices and any combination or variation thereof. Examples of mobile device 601 may also include desktop computers, server computers, and virtual machines, as well as any other type of computing system, variation, or combination thereof.

Computing system 603 comprises a processing system and communication transceiver. Computing system 603 may also include other components such as a user interface, data storage system, and power supply. Computing system 603 may reside in a single device or may be distributed across multiple devices. Examples of computing system 603 include mobile computing devices, such as cell phones, tablet computers, laptop computers, notebook computers, and gaming devices, as well as any other type of mobile computing devices and any combination or variation thereof. Examples of computing system 603 also include desktop computers, server computers, and virtual machines, as well as any other type of computing system, variation, or combination thereof.

Communication network 630 could comprise multiple network elements such as routers, gateways, telecommunication switches, servers, processing systems, or other communication equipment and systems for providing communication and data services. In some examples, communication network 630 could comprise wireless communication nodes, telephony switches, Internet routers, network gateways, computer systems, communication links, or some other type of communication equipment, including combinations thereof. Communication network 630 may also comprise optical networks, packet networks, local area networks (LAN), metropolitan area networks (MAN), wide area networks (WAN), or other network topologies, equipment, or systems—including combinations thereof. Communication network 630 may be configured to communicate over metallic, wireless, or optical links. Communication network 630 may be configured to use time-division multiplexing (TDM), Internet Protocol (IP), Ethernet, optical networking, wireless protocols, communication signaling, or some other communication format, including combinations thereof. In some examples, communication network 630 includes further access nodes and associated equipment for providing communication services to several computer systems across a large geographic region.

Application modification server 640 may be representative of any computing apparatus, system, or systems that may connect to another computing system over a communication network. Application modification server 640 comprises a processing system and communication transceiver. Application modification server 640 may also include other components such as a router, server, data storage system, and power supply. Application modification server 640 may reside in a single device or may be distributed across multiple devices. Application modification server 640 may be a discrete system or may be integrated within other systems, including other systems within communication system 600. Some examples of application modification server 640 include desktop computers, server computers, cloud computing platforms, and virtual machines, as well as any other type of computing system, variation, or combination thereof.

Referring now to FIG. 7, a block diagram that illustrates computing system 700 in an exemplary implementation is shown. Computing system 700 provides an example of mobile device 110, computing system 301, mobile device 601, computing system 603, application modification server 640, or any computing system that may be used to execute JIT translation prevention process 400 or variations thereof, although such systems could use alternative configurations. Computing system 700 includes processing system 701, storage system 703, software 705, communication interface 707, and user interface 709. Software 705 includes application 706 which itself includes JIT translation prevention process 400. JIT translation prevention process 400 may optionally be implemented separately from application 706 as indicated by the dashed lines surrounding process 400 in FIG. 7.

Computing system 700 may be representative of any computing apparatus, system, or systems on which application 706 and JIT translation prevention process 400 or variations thereof may be suitably implemented. Computing system 700 may reside in a single device or may be distributed across multiple devices. Examples of computing system 700 include mobile computing devices, such as cell phones, tablet computers, laptop computers, notebook computers, and gaming devices, as well as any other type of mobile computing devices and any combination or variation thereof. Note that the features and functionality of computing system 700 may apply as well to desktop computers, server computers, and virtual machines, as well as any other type of computing system, variation, or combination thereof.

Computing system 700 includes processing system 701, storage system 703, software 705, communication interface 707, and user interface 709. Processing system 701 is operatively coupled with storage system 703, communication interface 707, and user interface 709. Processing system 701 loads and executes software 705 from storage system 703. When executed by computing system 700 in general, and processing system 701 in particular, software 705 directs computing system 700 to operate as described herein for each implementation or variations thereof. Computing system 700 may optionally include additional devices, features, or functionality not discussed herein for purposes of brevity.

Referring still to FIG. 7, processing system 701 may comprise a microprocessor and other circuitry that retrieves and executes software 705 from storage system 703. Processing system 701 may be implemented within a single processing device but may also be distributed across multiple processing devices or sub-systems that cooperate in executing program instructions. Examples of processing system 701 include general purpose central processing units, application specific processors, and logic devices, as well as any other type of processing device, combinations, or variations thereof.

Storage system 703 may comprise any computer-readable storage media capable of storing software 705 and readable by processing system 701. Storage system 703 may include volatile and nonvolatile, removable and non-removable media implemented in any method or technology for storage of information, such as computer readable instructions, data structures, program modules, or other data. Storage system 703 may be implemented as a single storage device but may also be implemented across multiple storage devices or sub-systems co-located or distributed relative to each other. Storage system 703 may comprise additional elements, such as a controller, capable of communicating with processing system 701. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the computer-readable storage media a propagated signal.

In operation, in conjunction with user interface 709, processing system 701 loads and executes portions of software 705, such as JIT translation prevention process 400, to facilitate prevention of just-in-time translations of application functions as described herein. Software 705 may be implemented in program instructions and among other functions may, when executed by computing system 700 in general or processing system 701 in particular, direct computing system 700 or processing system 701 to modify a just-in-time (JIT) translation function of an operating system in memory to redirect the JIT translation function to execute alternative code when the JIT translation function is called. Software 705 may further direct computing system 700 or processing system 701 to, when the JIT translation function is called for an application function, execute the alternative code to determine whether the application function has been modified. Software 705 may also direct computing system 700 or processing system 701 to, when the alternative code determines that the application function has been modified, prevent the JIT translation function from translating the application function into a native machine code version. Further, software 705 may direct computing system 700 or processing system 701 to, when the alternative code determines that the application function has not been modified, allow the JIT translation function to translate the application function into the native machine code version.

Software 705 may include additional processes, programs, or components, such as operating system software or other application software. Examples of operating systems include Windows®, iOS®, and Android®, as well as any other suitable operating system. Software 705 may also comprise firmware or some other form of machine-readable processing instructions executable by processing system 701.

In general, software 705 may, when loaded into processing system 701 and executed, transform computing system 700 overall from a general-purpose computing system into a special-purpose computing system customized to facilitate prevention of just-in-time translations of application functions as described herein for each implementation or variations thereof. For example, encoding software 705 on storage system 703 may transform the physical structure of storage system 703. The specific transformation of the physical structure may depend on various factors in different implementations of this description. Examples of such factors may include, but are not limited to the technology used to implement the storage media of storage system 703 and whether the computer-readable storage media are characterized as primary or secondary storage.

In some examples, if the computer-readable storage media are implemented as semiconductor-based memory, software 705 may transform the physical state of the semiconductor memory when the program is encoded therein. For example, software 705 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 700 is generally intended to represent a computing system with which software 705 is deployed and executed in order to implement application 706 and/or JIT translation prevention process 400 to operate as described herein for each implementation (and variations thereof). However, computing system 700 may also represent any computing system on which software 705 may be staged and from where software 705 may be distributed, transported, downloaded, or otherwise provided to yet another computing system for deployment and execution, or yet additional distribution. For example, computing system 700 could be configured to deploy software 705 over the internet to one or more client computing systems for execution thereon, such as in a cloud-based deployment scenario.

Communication interface 707 may include communication connections and devices that allow for communication between computing system 700 and other computing systems (not shown) or services, over a communication network 711 or collection of networks. In some implementations, communication interface 707 receives dynamic data 721 over communication network 711. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 709 may include a voice input device, a touch input device for receiving a gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 709. In some examples, user interface 709 could include a touch screen capable of displaying a graphical user interface that also accepts user inputs via touches on its surface. The aforementioned user input devices are well known in the art and need not be discussed at length here. User interface 709 may also include associated user interface software executable by processing system 701 in support of the various user input and output devices discussed above. Separately or in conjunction with each other and other hardware and software elements, the user interface software and devices may provide a graphical user interface, a natural user interface, or any other kind of user interface. User interface 709 may be omitted in some implementations.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method to facilitate prevention of just-in-time translations of application functions, the method comprising:
   modifying a just-in-time (JIT) translation function of an operating system in memory to redirect the JIT translation function to execute alternative code when the JIT translation function is called;
   when the JIT translation function is called for an application function, executing the alternative code to determine whether the application function has been modified;
   when the alternative code determines that the application function has been modified, preventing the JIT translation function from translating the application function into a native machine code version; and
   when the alternative code determines that the application function has not been modified, allowing the JIT translation function to translate the application function into the native machine code version.

2. The method of claim 1 wherein executing the alternative code to determine whether the application function has been modified comprises determining whether the application function has been modified in memory to intercept an execution of the application function and instead run customized program code.

3. The method of claim 1 wherein executing the alternative code to determine whether the application function has been modified comprises checking whether the application function is included in a list of modified application functions.

4. The method of claim 3 wherein checking whether the application function is included in the list of modified application functions comprises querying the list of modified application functions with the application function and receiving a Boolean value returned from the querying that indicates whether the application function is included in the list of modified application functions.

5. The method of claim 1 further comprising modifying the application function in memory to intercept an execution of the application function and instead run customized program code and including the application function in a list of modified application functions upon modifying the application function in memory.

6. The method of claim 1 wherein the application function comprises a bytecode version of the application function.

7. The method of claim 1 wherein the JIT translation function is called for the application function after a threshold number of calls to the application function are exceeded.

8. One or more computer-readable storage media having program instructions stored thereon to facilitate prevention of just-in-time translations of application functions, wherein the program instructions, when executed by a computing system, direct the computing system to at least:
modify a just-in-time (JIT) translation function of an operating system in memory to redirect the JIT translation function to execute alternative code when the JIT translation function is called;
when the JIT translation function is called for an application function, execute the alternative code to determine whether the application function has been modified;
when the alternative code determines that the application function has been modified, prevent the JIT translation function from translating the application function into a native machine code version; and
when the alternative code determines that the application function has not been modified, allow the JIT translation function to translate the application function into the native machine code version.

9. The one or more computer-readable storage media of claim 8 wherein the program instructions direct the computing system to execute the alternative code to determine whether the application function has been modified by directing the computing system to determine whether the application function has been modified in memory to intercept an execution of the application function and instead run customized program code.

10. The one or more computer-readable storage media of claim 8 wherein the program instructions direct the computing system to execute the alternative code to determine whether the application function has been modified by directing the computing system to check whether the application function is included in a list of modified application functions.

11. The one or more computer-readable storage media of claim 10 wherein the program instructions direct the computing system to check whether the application function is included in the list of modified application functions by directing the computing system to query the list of modified application functions with the application function and receive a Boolean value returned from the query that indicates whether the application function is included in the list of modified application functions.

12. The one or more computer-readable storage media of claim 8 wherein the program instructions further direct the computing system to modify the application function in memory to intercept an execution of the application function and instead run customized program code and include the application function in a list of modified application functions upon modifying the application function in memory.

13. The one or more computer-readable storage media of claim 8 wherein the application function comprises a bytecode version of the application function.

14. The one or more computer-readable storage media of claim 8 wherein the JIT translation function is called for the application function after a threshold number of calls to the application function are exceeded.

15. A computing apparatus comprising:
one or more computer-readable storage media;
a processing system operatively coupled with the one or more computer-readable storage media; and
a mobile application stored on the one or more computer-readable storage media and including an embedded control module comprising program instructions that, when executed by the processing system, direct the processing system to at least:
modify a just-in-time (JIT) translation function of an operating system in memory to redirect the JIT translation function to execute alternative code when the JIT translation function is called;
when the JIT translation function is called for an application function, execute the alternative code to determine whether the application function has been modified;
when the alternative code determines that the application function has been modified, prevent the JIT translation function from translating the application function into a native machine code version; and
when the alternative code determines that the application function has not been modified, allow the JIT translation function to translate the application function into the native machine code version.

16. The computing apparatus of claim 15 wherein the program instructions direct the processing system to execute the alternative code to determine whether the application function has been modified by directing the processing system to determine whether the application function has been modified in memory to intercept an execution of the application function and instead run customized program code.

17. The computing apparatus of claim 15 wherein the program instructions direct the processing system to execute the alternative code to determine whether the application function has been modified by directing the processing system to check whether the application function is included in a list of modified application functions.

18. The computing apparatus of claim 17 wherein the program instructions direct the processing system to check whether the application function is included in the list of modified application functions by directing the processing system to query the list of modified application functions with the application function and receive a Boolean value returned from the query that indicates whether the application function is included in the list of modified application functions.

19. The computing apparatus of claim 15 wherein the program instructions further direct the processing system to modify the application function in memory to intercept an execution of the application function and instead run customized program code and include the application function in a list of modified application functions upon modifying the application function in memory.

20. The computing apparatus of claim 15 wherein the application function comprises a bytecode version of the application function.

* * * * *